United States Patent
Hsiao et al.

(10) Patent No.: US 7,679,258 B2
(45) Date of Patent: Mar. 16, 2010

(54) ECCENTRIC ROTOR AND VIBRATION MOTOR INCORPORATING THE ECCENTRIC ROTOR

(75) Inventors: Cheng-Fang Hsiao, Taipei Hsien (TW); Ye-Fei Yu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 423 days.

(21) Appl. No.: 11/614,749

(22) Filed: Dec. 21, 2006

(65) Prior Publication Data

US 2008/0150380 A1    Jun. 26, 2008

(51) Int. Cl.
*H02K 7/065* (2006.01)

(52) U.S. Cl. .................. 310/257; 310/81; 310/254.1; 310/49.34; 310/49.22; 310/49.21

(58) Field of Classification Search .............. 310/81, 310/257, 49.09, 49.19, 49.21, 49.22, 49.25, 310/49.34
See application file for complete search history.

(56) References Cited

U.S. PATENT DOCUMENTS

| | | | | |
|---|---|---|---|---|
| 3,633,055 | A | * | 1/1972 | Maier .................... 310/156.26 |
| 4,841,190 | A | * | 6/1989 | Matsushita et al. .......... 310/257 |
| 4,990,806 | A | * | 2/1991 | Kikuchi et al. ............. 310/49 A |
| 5,170,082 | A | * | 12/1992 | Nakagawa et al. ............ 310/45 |
| 5,793,133 | A | * | 8/1998 | Shiraki et al. ................. 310/81 |
| 6,166,470 | A | * | 12/2000 | Miyazawa et al. .......... 310/181 |
| 6,396,189 | B1 | * | 5/2002 | Matsushita et al. .......... 310/257 |
| 6,636,007 | B2 | * | 10/2003 | Hong et al. ................. 318/114 |
| 6,703,738 | B2 | * | 3/2004 | Yoshikawa et al. ............ 310/91 |
| 6,946,771 | B2 | * | 9/2005 | Cros et al. .................... 310/257 |
| 2002/0145347 | A1 | * | 10/2002 | Osawa et al. ................... 310/81 |
| 2002/0167237 | A1 | * | 11/2002 | Horng et al. .................. 310/81 |
| 2004/0007936 | A1 | * | 1/2004 | Cros et al. .................... 310/257 |
| 2004/0208004 | A1 | | 10/2004 | Hsiao |
| 2008/0018187 | A1 | * | 1/2008 | Yamaguchi et al. ........... 310/81 |
| 2008/0073996 | A1 | * | 3/2008 | Hsiao et al. ................. 310/257 |

FOREIGN PATENT DOCUMENTS

| | | | |
|---|---|---|---|
| CN | 1373546 A | | 10/2002 |
| CN | 2591858 Y | | 12/2003 |
| CN | 2640110 Y | | 9/2004 |
| JP | 9-182363 | * | 7/1997 |

* cited by examiner

*Primary Examiner*—Quyen Leung
*Assistant Examiner*—Terrance Kenerly
(74) *Attorney, Agent, or Firm*—Frank R. Niranjan (57) ABSTRACT

A vibration motor includes a housing, a stator (10) received in the housing (30) and a rotor (20) rotatably disposed in the stator. The stator includes two claw-pole assemblies (11) arranged back-to-back, and a shaft (23) being fixedly connected with the two claw-pole assemblies. The rotor includes a bearing (22) rotatably mounted around the shaft, a permanent magnet (26) mounted around the bearing, and an eccentric weight (24) fixedly attached to the permanent magnet. The eccentric weight includes a main body (240) and at least one inserting portion (244) having a density higher than that of the main body.

13 Claims, 7 Drawing Sheets

ECCENTRIC ROTOR AND VIBRATION MOTOR INCORPORATING THE ECCENTRIC ROTOR

BACKGROUND OF THE INVENTION

1. Field of the Invention

The present invention relates generally to a vibration motor, and more particularly to an eccentric rotor of the vibration motor.

2. Description of Related Art

Mechanical vibrations are required for many different applications. Such as vibrations for material pulverization and selection in industrial use, vibration for home massage machines, and silent notification of incoming calls and messages for mobile phones, are but a few examples of mechanical vibration applications.

There are various methods that can be used to produce mechanical vibrations. One method involves the use of electric motors. A conventional type of vibration motor includes a casing receiving a stator therein, a shaft connected with the stator, and a rotor being rotatably disposed around the shaft. The rotor includes a bearing mounted around the shaft and an eccentric weight attached to the bearing. Vibration is produced by the rotation of the rotor as a result of the eccentric weight attached to the rotor. However, the eccentric weight is usually made of copper. A density of the copper is about 8.9 g/cm$^3$, which is too small to enable the eccentric weight to generate a highly satisfied vibration effect.

SUMMARY OF THE INVENTION

According to a preferred embodiment of the present invention, a vibration motor includes a housing, a stator received in the housing and a rotor rotatably disposed in the stator. The stator includes two claw-pole assemblies arranged back-to-back, and a shaft fixedly connected with the two claw-pole assemblies. The rotor includes a bearing rotatably mounted around the shaft, a permanent magnet mounted around the bearing, and an eccentric weight fixedly attached to the permanent magnet. The eccentric weight includes a main body and at least one inserting portion having a density higher than that of the main body. The main body is made of plastic, bakelite, aluminum, copper, aluminum alloy or copper alloy, while the at least one inserting portion is made of tungsten or tungsten alloy. The at least one inserting portion is fixed to the main body at position near a periphery of the main body so that the at least one inserting portion is distant from a rotation center of the eccentric weight.

Other advantages and novel features of the present invention will be drawn from the following detailed description of a preferred embodiment of the present invention with attached drawings, in which:

BRIEF DESCRIPTION OF THE DRAWINGS

Many aspects of the present vibration motor can be better understood with reference to the following drawings. The components in the drawings are not necessarily drawn to scale, the emphasis instead being placed upon clearly illustrating the principles of the present vibration motor. Moreover, in the drawings, like reference numerals designate corresponding parts throughout the several views.

DETAILED DESCRIPTION OF THE INVENTION

Figure 1:
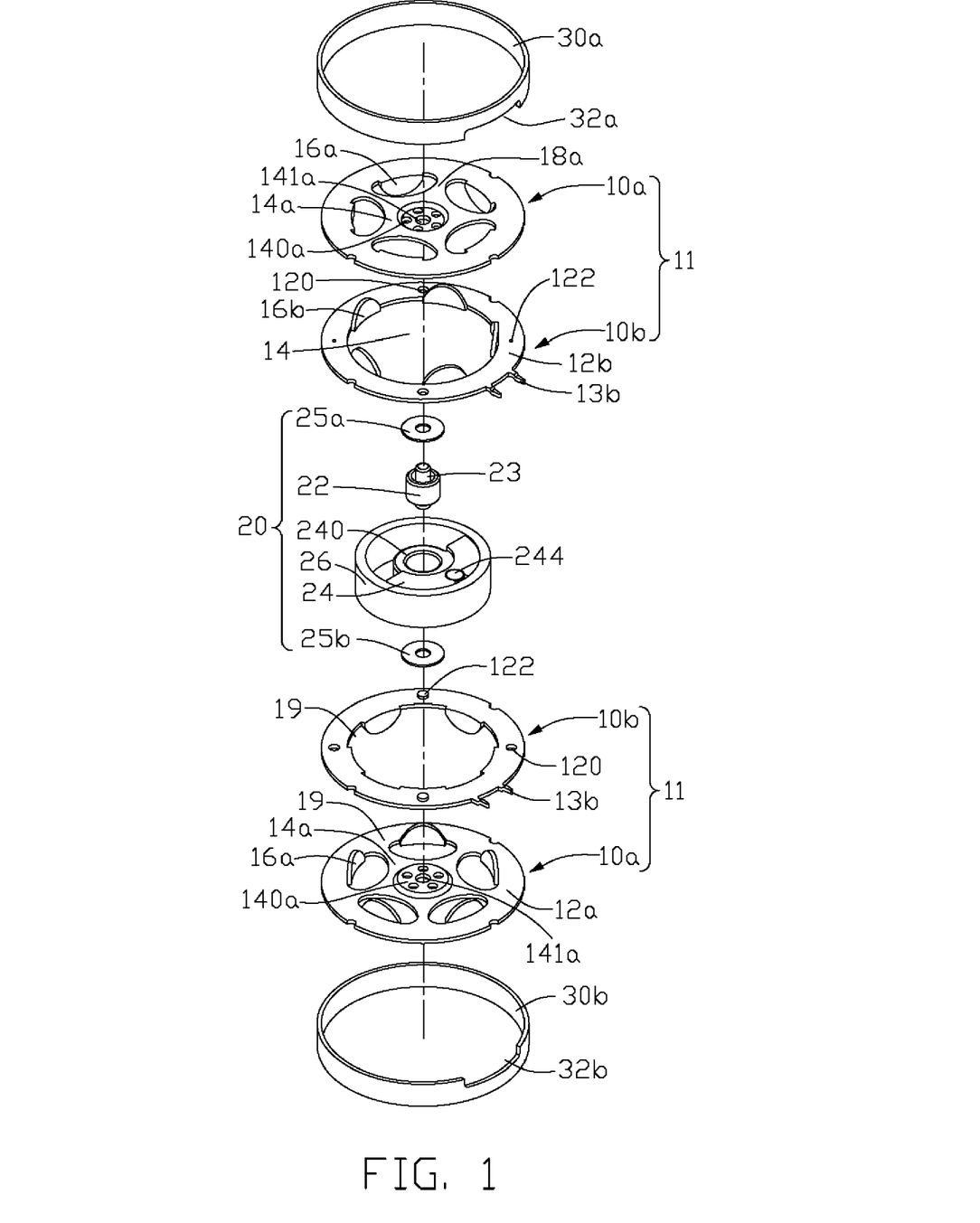
FIG. 1 is an isometric, exploded view of a vibration motor in accordance with a preferred embodiment of the present invention.
Figure 2:
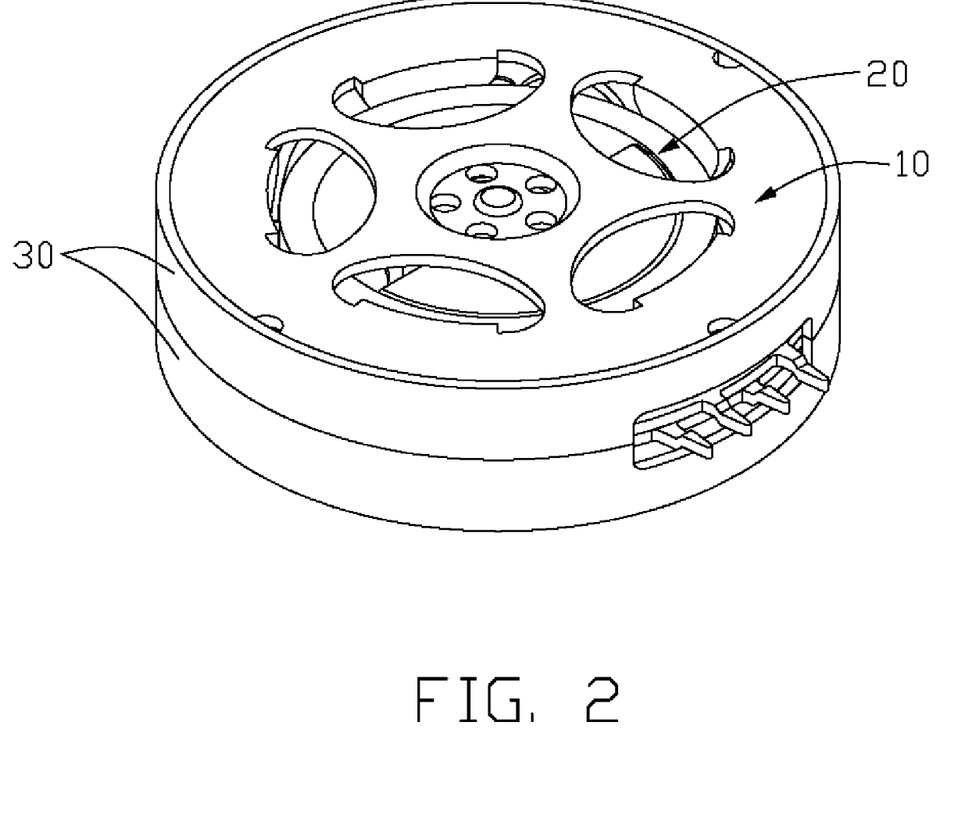
FIG. 2 is an isometric, assembled view of the vibration motor of FIG. 1.

Referring to FIGS. 1-2, a vibration motor according to a preferred embodiment can be used in a communication equipment, such as a calling machine, a mobile phone or the like, which includes a housing 30, a stator 10 received in the housing 30, and an eccentric rotor 20 being rotatably supported by the stator 10.

The housing 30 is cylindrical-shaped, including a lower portion 30b and an upper portion 30a located above and facing the lower portion 30b. Alternatively the housing 30 can be integrally formed. Each of the lower and upper portions 30a, 30b defines a cutout 32a, 32b in a free end thereof. When assembled the free ends of the two portions 30a, 30b abut against each other, and cooperatively the cutouts 32a, 32b define a passage in the housing 30 for connecting the motor with a power source (not shown). It is to be understood that the passage can be only formed in one of the portions 30a, 30b of the housing 30, according to the shape of the stator 10, for conveniently connecting the motor to the power source.

Figure 3:
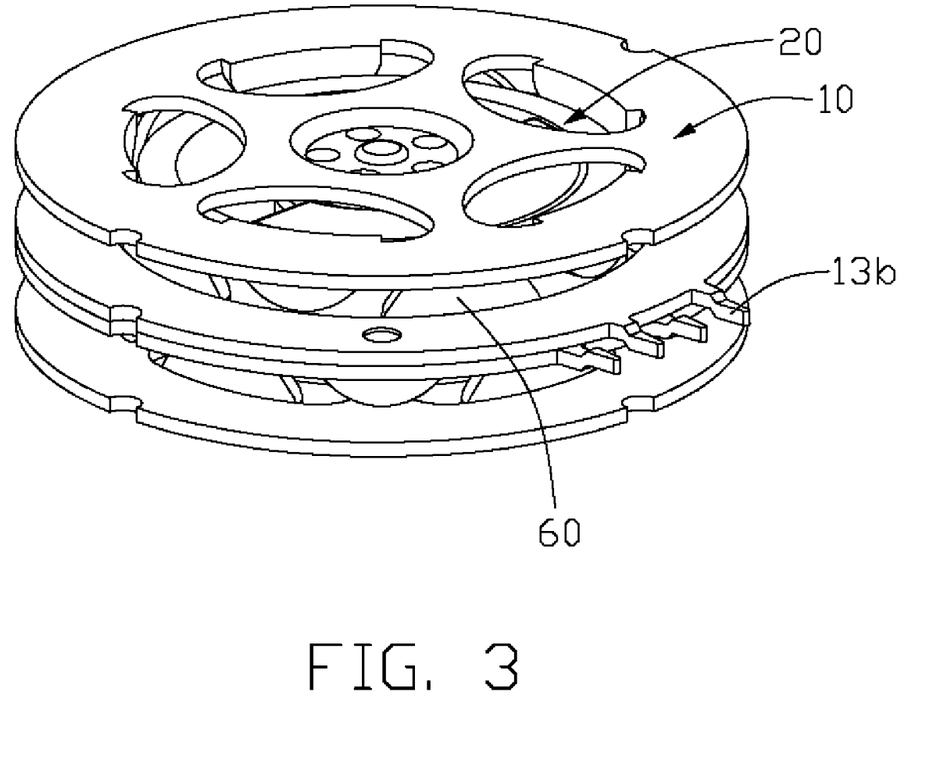
FIG. 3 is an isometric, assembled view of a stator of the vibration motor of FIG. 2.

Also referring to FIG. 3, the stator 10 includes upper and lower claw-pole assemblies 11 having size and shape the same with each other. Each of the claw-pole assemblies 11 includes an outer yoke 10a and an inner yoke 10b facing towards each other. Each of the inner yokes 10b of the claw-pole assemblies 11 is ring-shaped with a circular hole 14 defined therein. A plurality of pole teeth 16a, 16b extend perpendicularly from an inner circumference of each yoke 10a, 10b. Each tooth 16a, 16b forms an arc-shaped free end. In this embodiment, each yoke 10a, 10b forms five teeth 16a, 16b. It is to be understood that the number of the teeth 16a, 16b formed on the yokes 10a, 10b is decided by the precision requirement of the motor, being not limited to the disclosed embodiment. The pole teeth 16a, 16b of the yokes 10a, 10b are evenly spaced from each other along a circumferential direction thereof and thus define a plurality of slots 19 therebetween. Each pole tooth 16a, 16b has a shape and size the same as those of other teeth 16a, 16b. Each of the slots 19 has a size a little larger than that of the tooth 16a, 16b so as to receive a corresponding tooth 16a, 16b therein when the outer and inner yokes 10a, 10b are assembled together.

A circular-shaped mounting portion 14a is formed at a central portion of each of the outer yokes 10a. Five ribs 18a extend outwardly and radially from each mounting portion 14a to connect the mounting portion 14a with a periphery (not labeled) of the outer yoke 10a. The ribs 18a are evenly spaced from each other along a circumferential direction of the mounting portion 14a and are connected with the periphery of the outer yoke 10a between each two neighboring teeth 16a. The mounting portion 14a has an axis coincidental with that of the outer yoke 10a. A through hole 141a is defined in the mounting portion 14a with an axis coincidental with the axis of the mounting portion 14a. Several mounting holes 140a are defined in the mounting portion 14a around the through hole 141a and are evenly spaced from each other along the circumferential direction of the mounting portion 14a. The inner yoke 10b of each claw-pole assembly 11 forms two apertures 120 therein, and a pair of protrusions 122. The protrusions 122 of the upper inner yoke 10b extend downwardly therefrom, while the protrusions 122 of the lower inner yoke 10b extend upwardly therefrom. The apertures 120 and the protrusions 122 are alternately arranged and evenly spaced from each other along the circumferential direction of the inner yokes 10a. A pair of pins 13b are integrally formed with and extend outwardly from an outer periphery of each inner yoke 10b. The two pins 13b of each inner yoke 10b are spaced from and parallel to each other.

Each of the outer yokes 10a combines with a corresponding inner yoke 10b to form the claw-pole assembly 11. The inner yoke 10b and the outer yoke 10a of each claw-pole assembly 11 face to each other. The teeth 16a of each outer yoke 10a insert into the slots 19 of the corresponding inner yoke 10b, and the teeth 16b of each inner yoke 10b insert into the slots 19 of the corresponding outer yoke 10a. Thus the pole teeth 16a, 16b of the two yokes 10a, 10b of each claw-pole assembly 11 are intermeshed with each other. Along the circumferential direction of yokes 10a, 10b, the teeth 16a, 16b of the outer and inner yokes 10a, 10b of the claw-pole assembly 11 are arranged alternatively, and are separated from each other by an electrical angle of 180°. The teeth 16a, 16b of the yokes 10a, 10b of the claw-pole assembly 11 cooperatively form a cylindrical-shaped sidewall (not labeled) for coils (not shown) wound thereon. A narrow gap is defined between each two neighboring pole teeth 16a, 16b. The gaps between the teeth 16a, 16b are filled with resin inserted through the mounting holes 140a of the mounting portions 14a of the outer yokes 10a by insert molding; thus, the inner and outer yokes 10a, 10b are fixedly combined together to form the claw-pole assembly 11.

The two claw-pole assemblies 11 are then arranged back-to-back to form the stator 10 of the motor. The circular holes 14 of the inner yokes 10b cooperatively define a space receiving the rotor 20 therein. The two claw-pole assemblies 11 are located at two opposite upper and lower ends of the motor symmetrically. The inner yokes 10b of the two claw-pole assemblies 11 abut each other and are located approximately in a middle of the stator 10. The protrusions 122 of each inner yoke 10b extend into the apertures 120 of the other inner yoke 10b to fixedly assemble the two claw-pole assemblies together. The outer yokes 10a of the two claw-pole assemblies 11 are spaced from each other. The outer yoke 10a of the upper claw-pole assembly 11 is located at a top end of the stator 10, whilst the outer yoke 10a of the lower claw-pole assembly 11 is located at a bottom end of the stator 10. A shaft 23 is received in the space of the stator 10 with top and bottom ends thereof being fixedly received in the through holes 141a of the mounting portions 14a of the outer yokes 10a of the claw-pole assemblies 11. An axis of the shaft 23 is coincidental with that of the stator 10.

The eccentric rotor 20 includes a bearing 22 mounted around the shaft 23 and rotatable in respect thereto, a permanent magnet 26 mounted around the bearing 22, and an eccentric weight 24. The bearing 22 is received in the space of the stator 10 and located between the mounting portions 14a of the outer yokes 10a. A pair of spacers 25a, 25b made of highly abrasion-resistant material are respectively arranged on top and bottom ends of the bearing 22 for avoiding friction or impact between the bearing 22 and the outer yokes 10a during rotation of the rotor 20. The permanent magnet 26 is ring-shaped, and is received in the space of the stator 10. An outer diameter of the magnet 26 is approximately the same as or a little smaller than an inner diameter of the stator 10. An inner diameter of the magnet 26 is much larger than an outer diameter of the bearing 22 and thus an interspace is defined therebetween. The eccentric weight 24 is received in the interspace and sandwiched between the magnet 26 and the bearing 22. Alternatively, the eccentric weight 24 can be adhered to an outer surface of the magnet 26. In this case, the inner diameter of the magnet 26 is approximately the same as the outer diameter of the bearing 22 and adhered to an outer surface of the bearing 22.

Figure 4:
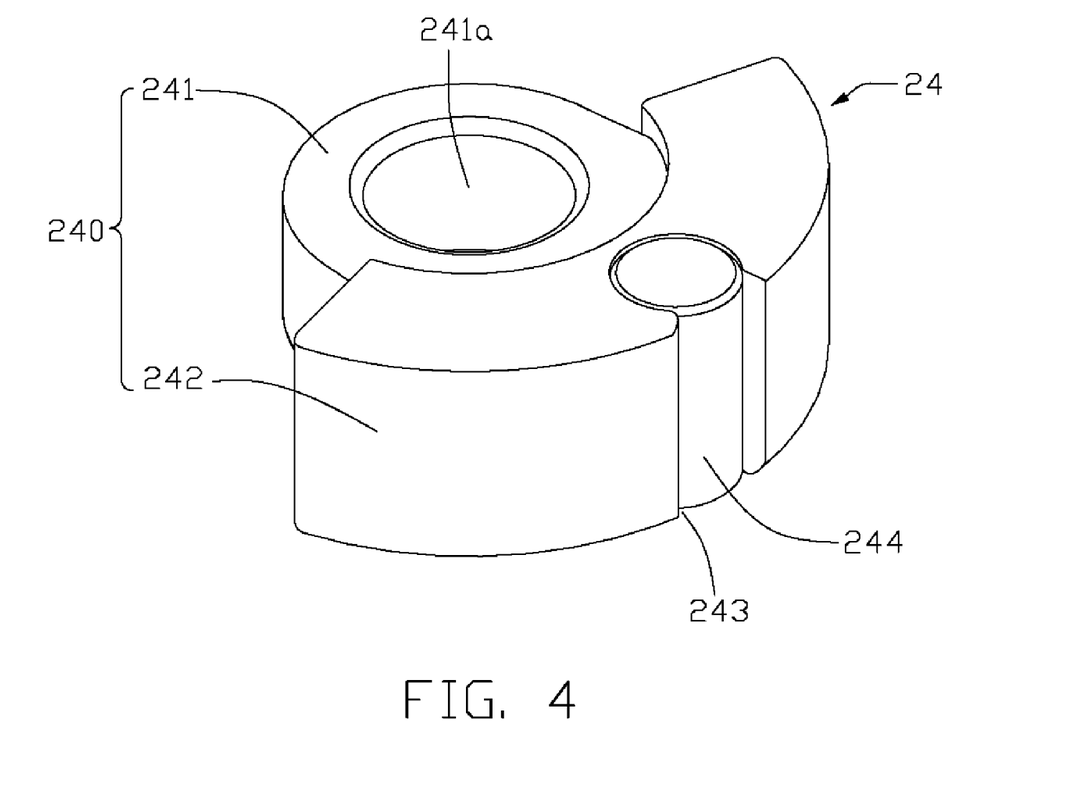
FIG. 4 is an isometric view of an eccentric weight of a rotor of the vibration motor of FIG. 2.

The eccentric weight 24 includes a main body 240 and an inserting portion 244 received in the main body 240. The main body 240 is made of plastic, bakelite, aluminum, copper or its alloy, including a cylinder 241 mounted around the bearing 22 through interference and a weight 242 integrally formed with the cylinder 241. The cylinder 241 defines an axial hole 241a receiving the bearing 22 therein. The weight 242 is substantially arc-shaped, and extends from an outer-periphery of the cylinder 241. The weight 242 has a height larger than that of the cylinder 241, and top and bottom ends of the weight 242 are located outside top and bottom ends of the cylinder 241 of the main body 240. An outer surface of the weight 242 is adhered to an inner surface of the magnet 26 by adhesive. Thus the bearing 22, the magnet 26 and the eccentric weight 24 are fixedly assembled together. A column-shaped slot 243 is defined in an outer periphery of the weight 242 of the main body 240. Along a circumferential direction of the weight 242, the slot 243 is located in a middle portion. The inserting portion 244 has a size and shape the same as that of the slot 243 of the weight 242. A cross section of the inserting portion 244 along a direction perpendicular to an axial direction thereof is circular shaped. In other words, the inserting portion 244 has a configuration like an elongate, round shaft. When the inserting portion 244 is inserted into the slot 243, top and bottom surfaces of the inserting portion 244 are coplanar with the top and bottom surfaces of the weight 242, respectively. The inserting portion 244 is made of tungsten or tungsten alloy, which has a density about 19.36 g/cm$^3$ and being much larger than that of the main body 240. The inserting portion 244 is fixedly mounted in the weight 242 of the main body 24 by interferential fit so that the inserting portion 244 rotates with the main body 24 when the motor is in operation. Alternatively, the inserting portion 244 can be fixedly attached to the weight 242 by riveting or soldering.

During assembly, the rotor 20 and the stator 10 are received in the housing 30. The two claw-pole assemblies 11 are separated from each other by an electrical angle of 90°. The pins 13b of the two inner yokes 10b are alternatively arranged; one pin 13b of each inner yoke 10b is located between the two pins 13b of the other inner yoke 10b. The four pins 13b are parallel to each other and located at a same plane. Two coils (not shown) respectively wind around the sidewalls formed by the intermeshed pole teeth 16a, 16b. Each coil has two ends connected to the two pins 13b of a corresponding inner yoke 10b to be electrically connected to the power source. The rotor 20 is rotatably mounted around the shaft 23. During operation, currents are applied to the coils by the power source. An alternating magnetic field is thus generated by the stator 10 to interact with the magnetic field established by the permanent magnet 26 to drive the rotor 20 of the motor into rotation. As the weight 242 of the eccentric weight 24 is arc shaped, a center of gravity of the rotor 20 is offset from an axis of rotation, thereby vibration is produced due to the eccentricity of weight of the rotor 20. As the inserting portion 244 has much larger density than that of the main body 240, the weight of the eccentric weight 24 of the rotor 20 is increased. Accordingly, when the rotor 20 is rotated, the vibration motor in accordance with the present invention will have a better vibration effect. Moreover, since the inserting portion 244 is located adjacent to an outer periphery of the weight 242 which is far from the axis of the rotation, the vibration effect can be enhanced.

Figure 5:
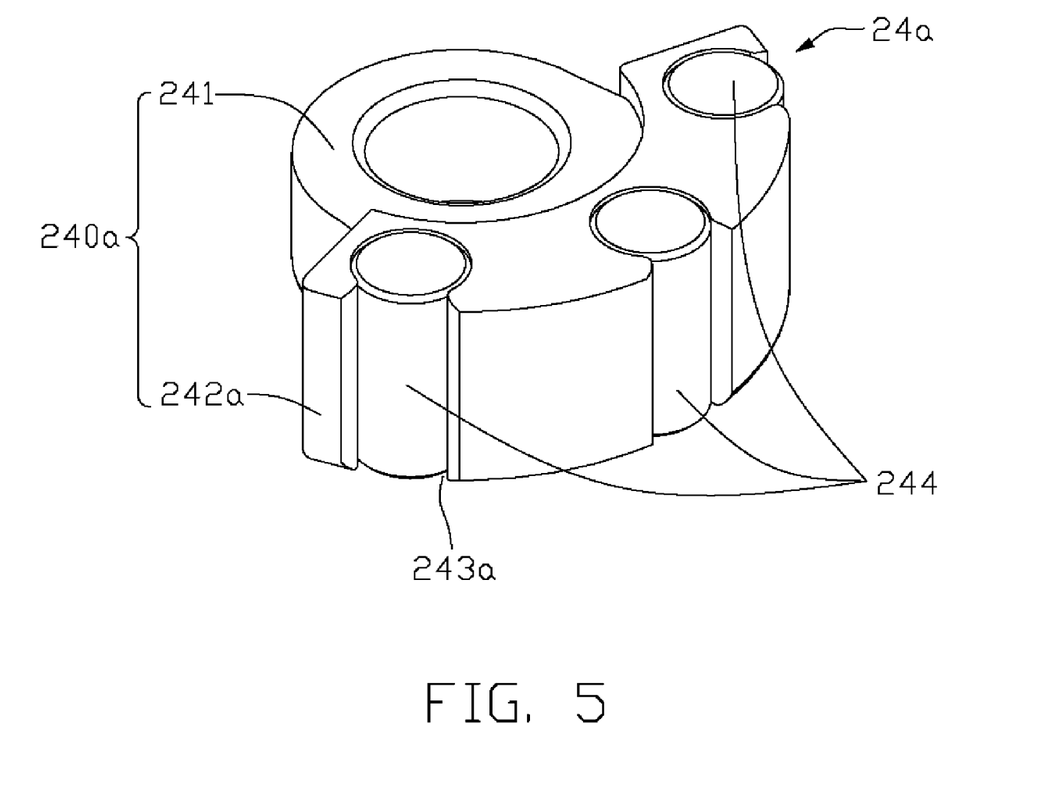
FIG. 5 is similar to FIG. 4, but shows the eccentric weight in accordance with a second embodiment of the present invention.

FIG. 5 shows an alternative embodiment of the eccentric weight of the rotor of the motor. The difference of the second embodiment over the first embodiment is that the weight 242*a* of the main body 240*a* of the eccentric weight 24*a* defines three slots 243*a* therein. The slots 243*a* are evenly spaced from each other along the circumferential direction of the weight 242*a*. Three inserting portions 244 are respectively received in the slots 243*a*. Also the inserting portions 244 are made of tungsten or tungsten alloy to increase the weight of the eccentric weight 24*a* and further move a center of weight of the eccentric weight 24*a* away from the rotation center. It is to be understood that the number of the inserting portions 244 can be changed according to the vibration intensity requirement of the vibration motor, being not limited to the disclosed embodiments.

Figure 6:
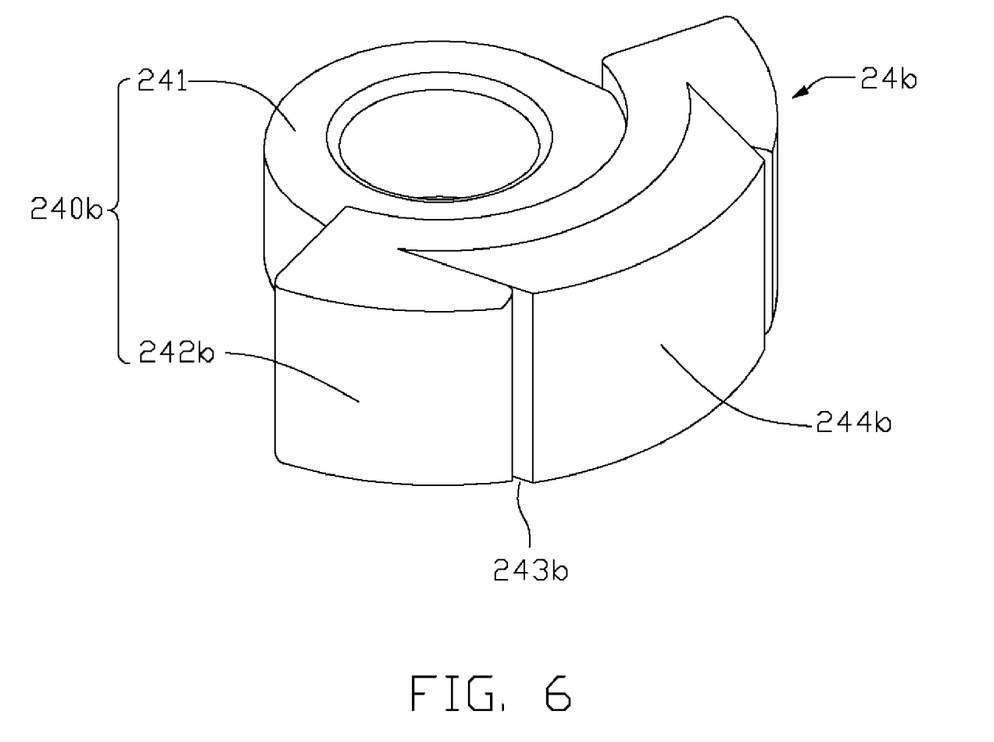
FIG. 6 shows an isometric view of a third embodiment of the eccentric weight.
Figure 7:
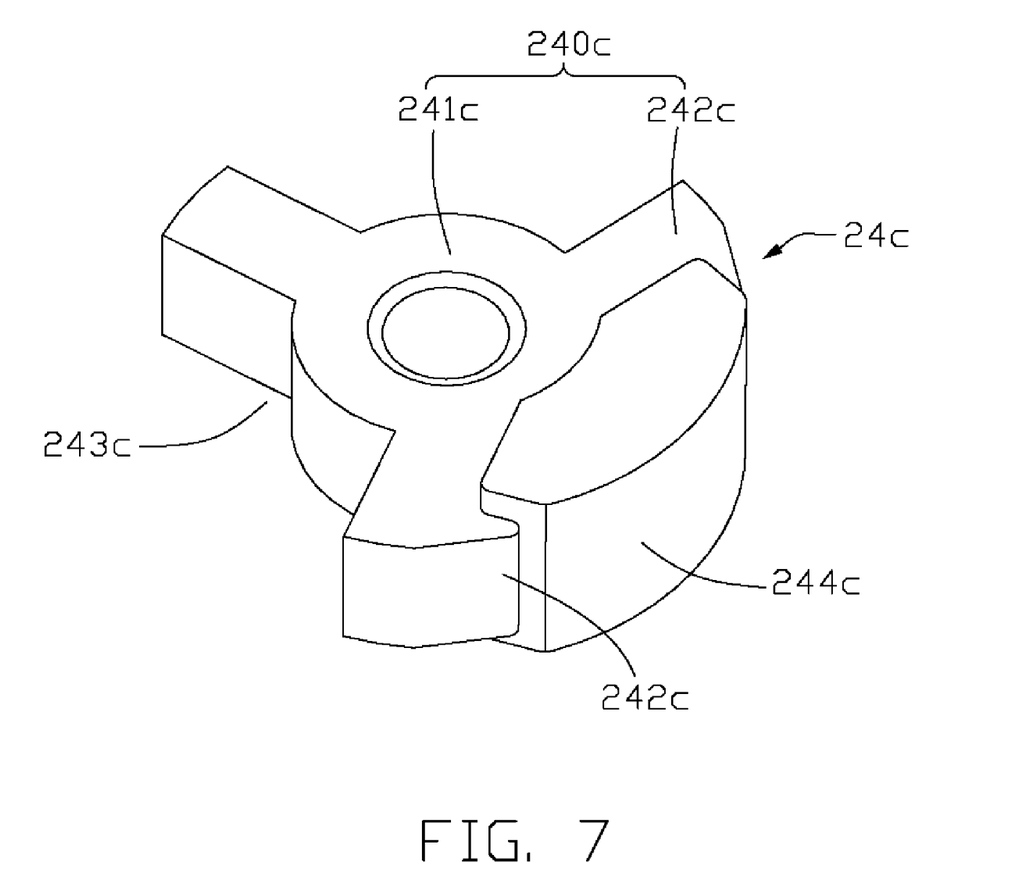
FIG. 7 shows an isometric view of a fourth embodiment of the eccentric weight.

FIGS. 6-7 shows the inserting portions of the eccentric weights have different shapes. In these embodiments, the inserting portions 244*b*, 244*c* of the eccentric weights 24*b*, 24*c* have cross sections being irregular shaped. Alternatively, the inserting portions 244*b*, 244*c* can be cones or cuboids. As shown in FIG. 6, the eccentric weight 24*b* includes a cylinder 241 and a weight 242*b*. The weight 242*b* defines a slot 243*b* therein. The inserting portion 244*b* is fixedly received in the slot 243*b*. The inserting portion 244*b* has a shape approximately the same as, but has a size larger than that of the slot 243*b*. When the inserting portion 244*b* is assembled with the main body 240*b*, the inserting portion 244*b* has a smaller part extending radially to an outside of the weight 242*b*. FIG. 7 shows a fourth embodiment of the eccentric weight. The main body 240*c* of the eccentric weight 24*c* includes a cylinder 241*c* and three weight 242*c* extend radially and outwardly from the cylinder 241*c*. The cylinder 241*c* and the weights 242*c* have the same height. The three weights 242*c* are evenly spaced from each other along the circumferential direction of the cylinder 241*c* and thus define three slots 243*c* each between two neighboring weights 242*c*. The inserting portion 244*c* has a height larger than that of the main body 240*c*. When the inserting portion 244*c* is mounted into a slot 243*c* of the main body 240*c*, top and bottom surfaces are located outside top and bottom ends of the main body 240*c*.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A vibration motor, comprising:
a housing;
a stator received in the housing, comprising two claw-pole assemblies arranged back-to-back and a shaft being fixedly connected with the two claw-pole assemblies; and
a rotor being rotatably disposed in the stator, the rotor comprising a bearing being rotatably mounted around the shaft, a permanent magnet mounted around the bearing, and an eccentric weight being fixedly attached to the permanent magnet, the eccentric weight comprising a main body and at least one inserting portion having a density higher than that of the main body; and
wherein each claw-pole assembly comprises inner and outer yokes facing towards each other, a plurality of pole teeth extending from each of the yokes of each claw-pole assembly and being intermeshed with those of the other yoke, each outer yoke comprising a mounting portion concaved from a middle portion of each outer yoke towards the other outer yoke, the mounting portion defining a through hole with one end of the shaft being fixedly received therein and a plurality of mounting holes for resin being inserted therethrough to fill gaps between each two neighboring pole teeth.

2. The vibration motor of claim 1, wherein the eccentric weight is sandwiched between the permanent magnet and the bearing.

3. The vibration motor of claim 1, wherein the main body is made of one of the following materials: plastic, bakelite, aluminum, copper, aluminum alloy and copper alloy, and comprises a cylinder mounted around the bearing and a weight extending outwardly therefrom and being integrally formed with the cylinder, the inserting portion being received in the weight of the main body.

4. The vibration motor of claim 3, wherein the at least one inserting portion is made of one of tungsten and tungsten alloy.

5. The vibration motor of claim 4, wherein the at least one inserting portion is fixedly mounted in the weight of the main body by soldering.

6. The vibration motor of claim 3, wherein the at least one inserting portion comprises several portions being symmetrically mounted in the weight.

7. The vibration motor of claim 1, wherein the at least one inserting portion has one of the following shapes: column, cone, cuboid and irregular-shape.

8. The vibration motor of claim 1, wherein the inner yokes of the two claw-pole assemblies abut against each other, each inner yoke forming at least a protrusion thereon and defining at least an aperture receiving the at least a protrusion of the other inner yoke therein.

9. The vibration motor of claim 1, wherein the two claw-pole assemblies are mounted around the rotor symmetrically.

10. The vibration motor of claim 4, wherein the at least one inserting portion is fixedly mounted in the weight of the main body by riveting.

11. The vibration motor of claim 4, wherein the at least one inserting portion is fixedly mounted in the weight of the main body by interferential fitting.

12. The vibration motor of claim 1, wherein an outer surface of the eccentric weight contacts an inner surface of the permanent magnet.

13. The vibration motor of claim 1, wherein each inner yoke is ring-shaped with a circular hole defined therein, the bearing being received in the circular holes of the inner yokes and located between the outer yokes, a pair of spacers respectively arranged on top and bottom ends of the bearing for avoiding friction between the bearing and the outer yokes during rotation of the rotor.

* * * * *